US005506034A

United States Patent [19]

Pies et al.

[11] Patent Number: 5,506,034

[45] Date of Patent: Apr. 9, 1996

[54] WORKPIECE MANUFACTURED BY A FILM COATED PASSIVATION PROCESS

[75] Inventors: John R. Pies; Donald J. Hayes, both of Plano, Tex.

[73] Assignee: Compaq Computer Corporation, Houston, Tex.

[21] Appl. No.: 232,697

[22] Filed: Apr. 25, 1994

Related U.S. Application Data

[62] Division of Ser. No. 947,830, Sep. 21, 1992, Pat. No. 5,334,415.

[51] Int. Cl.[6] ....... B32B 23/02

[52] U.S. Cl. ....... 428/194; 428/192; 428/195; 428/336; 428/411.1

[58] Field of Search ....... 428/336, 411.1, 428/192, 194, 195; 427/58, 96, 122

[56] References Cited

U.S. PATENT DOCUMENTS

| | | | |
|---|---|---|---|
| 3,136,323 | 6/1964 | Martz et al. | 134/153 |
| 3,424,319 | 1/1969 | Hohlfelder, Jr. et al. | 269/57 |
| 3,663,277 | 5/1972 | Koepp et al. | 117/201 |
| 3,834,613 | 9/1974 | Hankey | 118/52 |
| 4,271,209 | 6/1981 | DePalma et al. | 427/58 |
| 4,640,846 | 2/1987 | Kuo | 427/82 |
| 4,777,494 | 10/1988 | Shibata et al. | 347/64 |
| 4,784,970 | 11/1988 | Solomon | 437/51 |
| 4,887,100 | 12/1989 | Michaelis et al. | 347/69 |
| 4,971,676 | 11/1990 | Doue et al. | 118/503 |
| 5,102,685 | 4/1992 | Brosig et al. | 427/26 |
| 5,187,499 | 2/1993 | Murakami | 347/64 |
| 5,211,986 | 5/1993 | Ohkubo | 427/240 |
| 5,212,496 | 5/1993 | Badesha et al. | 346/1.1 |
| 5,219,615 | 6/1993 | Nakazawa et al. | 427/240 |
| 5,235,352 | 8/1993 | Pies et al. | 347/71 |
| 5,334,415 | 8/1994 | Hayes et al. | 427/231 |

FOREIGN PATENT DOCUMENTS

| | | |
|---|---|---|
| 0277756 | 1/1988 | European Pat. Off. . |

OTHER PUBLICATIONS

Patent Abstracts of Japan, vol. 016, No. 456 (M–1314) 22 Sep. 1992 & JP,A,04 161 341 (Fuji Xerox Co. Ltd.) 4 Jun. 1992.

Patent Abstracts of Japan, vol. 011, No. 102 (M–576) 31 Mar. 1987 & JP,A,61 249 766 (Canon Inc.) 6 Nov. 1986.

*Primary Examiner*—Patrick J. Ryan
*Assistant Examiner*—William A. Krynski
*Attorney, Agent, or Firm*—Konneker & Bush

[57] ABSTRACT

A method for film coated passivation of individual grooves or channels in an array of closely spaced grooves or channels of a workpiece, for example, ink channels in a printhead employed in an ink jet printer device; includes the steps of placing the workpiece on a rotation plate having a rotational center, securing the workpiece to the rotation plate with the grooves directed radially outward from the rotational center of the rotation plate, placing resin upon the workpiece in the vicinity of the grooves, and spinning the rotation plate to cause the resin to migrate along the surfaces of the grooves and thereby coating them.

14 Claims, 1 Drawing Sheet

WORKPIECE MANUFACTURED BY A FILM COATED PASSIVATION PROCESS

This is a division of application Ser. No. 07/947,830, filed Sep. 21, 1992, now U.S. Pat. No. 5,334,415.

BACKGROUND OF THE INVENTION

1. Field of the Invention

The invention relates to a method and apparatus for manufacturing ink Jet printheads and the product printheads derived therefrom, and, more particularly, to a method and apparatus for film coated passivation of side walls of ink channels in ink Jet printheads and printheads with ink channel side walls film coated by such method.

2. Description of the Related Art

Printers provide a means of outputting a permanent record in human readable form. A printing technique may generally be categorized as either impact printing or non-impact printing. A popular form of non-impact printing is referred to as ink jet printing. In ink jet printing, ink is ejected, most commonly by pressure, through a tiny nozzle to form an ink droplet that is deposited upon a paper medium. Such ink jet printing devices produce highly reproducible and controllable droplets, so that a droplet may be printed at a location specified by digitally stored data.

Most commercially available ink jet printing systems may be generally classified as either a "continuous jet" type ink jet printing system or a "drop on demand" type ink jet printing system. In a continuous jet type ink jet printing system, ink droplets are continuously ejected from the printhead and either directed to or away from the paper medium depending on the desired image to be produced. In such system, uniform ink droplets are formed from a stream of liquid issuing from an orifice. The ink stream in this type system is in continuous flow as a result of mechanically-induced pressure thereupon. A mechanism, often of an electromechanical material such as piezoelectric material, oscillates in response to an applied voltage to cause break-up of the continuous stream into uniform droplets of ink and to impart an electrostatic charge to the droplets. High voltage deflection plates located in the vicinity of the ejected ink droplets selectively control the trajectory of the ink droplets causing the droplets to hit a desired spot on the paper medium. Since a continuous flow of ink is employed in this type system, it is referred to as continuous.

In a "drop on demand" type ink jet printing system, ink droplets are ejected from the printhead in response to a specific command related to the image to be produced. The ink droplets are produced as a result of electromechanically induced pressure waves. The ink is typically saliently stored in a reservoir or channel. A volumetric change in the ink fluid so stored is then induced by the application of a voltage pulse to an electromechanical material, such as a piezoelectric material, which is directly or indirectly coupled to the fluid. This volumetric change causes pressure/velocity transients to occur in the fluid and these are directed so as to produce a droplet that issues from the reservoir or channel, typically through an orifice. Since the voltage is applied only when a droplet is desired, these types of ink jet printing systems are referred to as drop-on-demand.

The use of piezoelectric materials in ink jet printers is well known. Most commonly, piezoelectric materials are used in a piezoelectric transducer by which electric energy is converted into mechanical energy by applying an electric field across the material, thereby causing the piezoelectric material to deform. This ability to distort piezoelectric material by application of an electric field has often been utilized in order to interrupt or distort ink flow in a continuous type system or to force the ejection of ink from reservoirs or channels of drop on demand type systems.

One drop on demand type ink jet printer configuration which utilizes the distortion of a piezoelectric material to eject ink includes a printhead forming an ink channel array in which the individual channels of the array each have side walls formed at least, in part, of a piezoelectric material. In the typical case of such an array, the channels are micro-sized and are arranged such that the spacing between adjacent channels is relatively small. In operation of this type printhead, ink is directed to and resides in the channels until selectively ejected therefrom. Ejection of ink from select channels is effected due to the electromechanical nature of the piezoelectric side walls of the channels. Because piezoelectric material deforms when an electric field is applied thereacross, the side walls of selective channels may be caused to deform by applying an electric field across select ones thereof. The electric field may be so selectively applied by digital or other means. This deformation of side walls of select channels reduces the volume of the respective channels creating a pressure pulse in the ink residing in those channels. The resultant pressure pulse then causes the ejection of a droplet of ink from the front end of the particular channel adjacent side walls across which the electric field is applied.

Many ink jet printheads also include a cover plate fixedly mounted on the front end of the printhead adjacent ink channels. Extending through such a cover plate may be a plurality of orifices which comprise an array. In most ink jet printheads, each orifice in such an orifice array corresponds to one of the ink channels of the printhead. A cover plate is typically positioned abutting the printhead in a manner so that each orifice is in communication with a corresponding channel of the printhead, When a pressure wave is created in ink in a typical ink jet printhead due to electromechanical action or otherwise, an ink droplet is forcibly ejected from the ink jet printhead through the orifice. This type of orifice can form an appropriate ink droplet to create a desired impression as the droplet is thereby deposited on a paper medium.

In a typical configuration of an array of closely spaced channels the side walls of which are formed of electromechanical materials and across which side walls is selectively applied an electrical field to particular ones of the side walls, for example as in a drop on demand type ink jet printhead, the very close spacing between side walls of the channels and the conductive nature of fluid, such as ink, within the channels leads to problems with shorting of electricity. Electricity applied to select side walls of channels may short from select side walls to which electrical field is selectively applied, through the fluid within the adjacent channels, and to non-select side walls located adjacent the channels. This type of shorting can result in unintended deformation of side walls adjacent the particular select side wall causing the non-select side walls to also deform, for example causing ejection of ink from non-select adjacent channels in ink jet printheads. In ink jet printheads, unintended ejection of ink from adjacent channels distorts the intended print and reduces print quality due to irregular definition of print characters formed from the unintentionally ejected droplets. It would be an improvement over the prior art to have a method and apparatus to reduce or eliminate shorting of electrical field among select and non-select side walls of channels in a device, for example an ink jet printhead. This type of improvement in ink jet printheads would reduce ejection of ink from non-select channels, limiting ejection to those select channels have side walls across which electrical field is intentionally applied. To applicant's knowledge, a method for reducing shorting of this type, for example by film coated passivation of surfaces .of side walls of ink channels, has not been practiced to date and an apparatus therefor and product therefrom has not heretofore existed.

SUMMARY OF THE INVENTION

The present invention relates to a method for coating surfaces of channels of a workplace. More particularly, one aspect of the present invention includes placing a workpiece on a rotation plate having a centrum for rotation, securing the workplace in position upon the rotation plate such that the channels of the workpiece are generally directed from the centrum radially outward, depositing an insulating resin upon the workpiece relative to the channels of the workpiece generally towards the centrum, and spinning the rotation plate to cause the insulating resin to migrate along surfaces of the channels coating the surfaces thereof due to centrifugal force.

In another aspect, the invention includes the above described method wherein more than one workpiece is simultaneously coated by the method.

In yet another aspect, the invention includes the above described method wherein the securing is by means including at least one clamp.

In a further aspect, the invention includes the above described method wherein the spinning is at a speed of from about 1 revolution per minute to about 10,000 revolutions per minute.

In other aspects of the invention, the invention includes placing an insulative resin relative to surfaces of microgrooves of an ink jet printhead and forcing the insulative resin to coatingly migrate along the surfaces.

In another aspect, the invention includes such method wherein the forcing is by spinning the printhead in a manner such that centrifugal force causes migration of the insulative resin along the surfaces.

In a further aspect, the invention includes the above described method wherein the forcing is by placing the printhead on a rotation plate having a centrum for rotation, securing the printhead in position on the rotation plate such that the microgrooves of the printhead are generally directed from the centrum radially outward, and spinning the rotation plate to cause the insulating resin to migrate across the surfaces of the microgrooves due to centrifugal force.

In other aspects of the invention, the invention includes filling microgrooves of an ink jet printhead with an insulative resin and removing from the microgrooves the insulative resin in excess of that necessary for coating surfaces of the microgrooves in a desirable manner.

In another aspect, the invention includes such method wherein the removing is by spinning the ink jet printhead such that centrifugal force causes migration from the microgrooves of the insulative resin in excess of that necessary for coating surfaces of the microgrooves.

In yet another aspect, the invention includes the above described method wherein microgrooves of more than one ink jet printhead are simultaneously insulated by the method.

In a further aspect of the invention, the invention includes coating surfaces of microgrooves of a printhead with an insulative resin.

The invention further relates to an apparatus for coating an insulative resin across surfaces of channels of a workpiece. More particularly, one such aspect of the present invention includes a rotation plate and a means, incorporated with the rotation plate, for securing the workpiece in a select relation with the rotation plate.

In another aspect, the invention includes the above described apparatus wherein the means for securing the workpiece includes at least one clamp.

In yet another aspect, the invention includes the above described apparatus which is suitable for simultaneous coating of more than one workpiece.

The invention additionally relates to an apparatus for coating surfaces of microgrooves of a printhead. More particularly, one aspect of the present invention includes a rotating means and a means for securing the printhead in select relation with the rotating means for rotation therewith.

In another aspect, the invention includes the above described apparatus suitable for simultaneous coating of microgrooves of more than one printhead.

The invention also relates to an apparatus for coating surfaces of microgrooves of a printhead. More particularly, one aspect of such invention includes a rotation plate and a means, incorporated with the rotation plate, for securing the printhead in a select relation with the rotation plate.

In another aspect, the rotation plate of the above described apparatus rotates at a centrum thereof and the means allows the printhead to be secured such that said microgrooves extend radially from the centrum.

In yet another aspect, the invention is a method for film coating surfaces of a workpiece comprising the step of depositing an insulative resin on the surfaces.

The invention also relates to the respective product workpieces and printheads manufactured by the methods of the present invention.

BRIEF DESCRIPTION OF THE DRAWINGS

For a more complete understanding of the present invention and for further objects and advantages thereof, reference may now be had to the following description in conjunction with the accompanying drawings, in which.

DETAILED DESCRIPTION

Figure 1A:
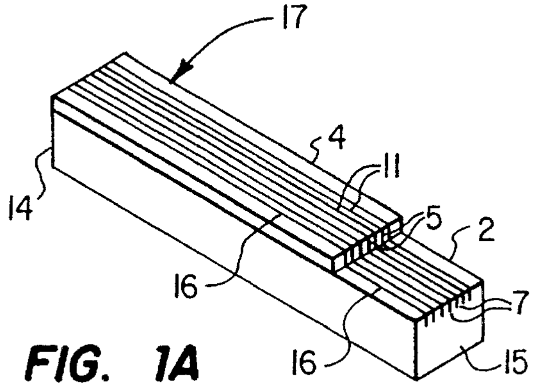
FIG. 1A is a perspective view of a base piece of one example of a workpiece, an ink jet printhead, showing a middle piece positioned thereon.
Figure 1B:
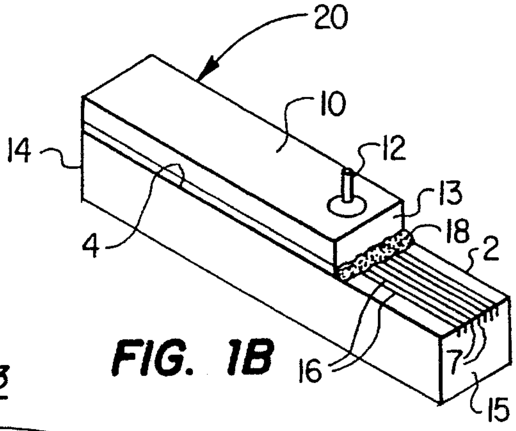
FIG. 1B is a perspective view of one example of a workpiece, an ink jet printhead, comprising the base piece of FIG. 1A, in final manufactured form.

In the detailed description that follows, to facilitate understanding of the present invention, and as an example only, an exemplary workpiece for the film-coated passivation process of the present invention is shown in certain stages of manufacture in FIGS. 1A and 1B. This exemplary workpiece is one type of "drop on demand" type ink jet printhead. This printhead workpiece is intended only as an example of the type workpiece with which the process is effective and it should be expressly understood that the present invention is not necessarily limited to that application, although the invention has been found to work especially well in actual practice when so used. Further, it should also be expressly understood that a multitude of different embodiments of the present invention could be employed in the particular application described; as is typical and understood, the present invention is limited solely by the scope of the appended claims.

Referring now to FIG. 1A, a base piece 2 and middle piece 4 of the exemplary workpiece in beginning stages of a typical manufacture method is shown. In such a typical ink jet printhead, the base piece 2 is formed of a ceramic or other material which may be, but is not necessarily, an electromechanical material such as a piezoelectric material. The base piece 2 is coated with gold or some other suitable conductive layer. Atop the base piece 2 is affixed a middle piece 4 which is a thin piece of a piezoelectric material. The middle piece 4 is also coated with a suitable conductive layer prior to being affixed in place atop the base piece 2 by a conductive adhesive.

Once the middle piece 4 is affixed atop the base piece 2, microgrooves 16 may then be formed longitudinally along the middle piece 4 and the base piece 2. A diamond saw, commonly called a dicing saw, or other suitable cutting or forming device or process may be employed to cut or form the microgrooves 16. In an ink jet printhead workpiece, the microgrooves 16 may typically be quite small and closely spaced in an array. The microgrooves 16 typically extend from the head end 14 to the butt end 15 of the base piece 2 and middle piece 4 assembly and may extend to a depth at least the thickness of the middle piece 4 but less than the thickness of the middle piece 4 and base piece 2 assembly.

The cutting of the microgrooves creates channels within the base piece 2 and middle piece 4 so that ink fluid placed therein may flow within the channels along the length of the assembly. The cutting also creates ridges 11 which separate the microgrooves 16. Each ridge 11 is thus formed of a base piece portion 7 and a middle piece portion 5. The middle piece portion 5 and base piece portion 7 of each ridge 11 abut to form a segregated electrically conductive length from the head end 14 to the butt end 15 of the workpiece. This arrangement allows for segregated conduction of electricity along selective ones of the ridges 11 where the middle piece portion 5 and base piece portion 7 of the ridge 11 abut.

Referring now to FIG. 1B, the exemplary workpiece is shown in a later stage of manufacture. This workpiece is comprised of a base piece 2, having a middle piece 4 adhesively affixed in place atop the base piece 2, with microgrooves 16 extending through the middle piece 4 and a suitable depth into the top surface of the base piece 2 longitudinally from the butt end 15 to the head end 14 of the assembly. Located and epoxied in place atop the middle piece 4 is an injector top 10. The injector top 10 may be conductively coated and when affixed in place atop the middle piece 4 may be conductively adhered to the tops of each of the ridges 11. In this exemplary workpiece, the injector top 10 may serve as a common ground for each of the ridges 11 along the top thereof.

As is apparent, many variations of this exemplary workpiece are possible. As examples of some of the variations, without intending to limit the possibilities, the injector top 10 of the workpiece may incorporate an injector tube 12 which extends from atop the injector top 10, therethrough, to the surface of the middle piece 4 located beneath the injector top 10. If so manufactured, the injector tube 12 may provide a means for inserting ink into the microgrooves 16 located under the injector top 10. Further, in order to limit the flow of ink inserted into the injector tube 12 to the head end 14 of the assembly, a row of insulating resin 18, such as epoxy or some other impervious material, may be placed at the stop end 13 of the injector top 10 at the middle piece 4 and the top surface of the base piece 2 to plug the microgrooves 16 at that location. Thus, as ink flows into the injector tube 12, through the injector top 10, into the microgrooves 16 formed in the middle piece 4 and the base piece 2, the ink may be directed only towards and out the head end 14 of the assembly. Another possible variation is that an orifice plate may be located at the head end 14 of the printhead 20. The orifice plate may cause ink ejected from particular microgrooves 16 of the printhead 20 to project through the orifice plate in a manner creating a desired impression upon a paper medium placed in relation to the orifice plate.

When a workpiece, such as the exemplary ink jet printhead workpiece described herein, is installed in a device, for example, in an ink jet printer, circuitry of the device selectively interconnects with selective ones of the ridges 11 at the abutting middle piece portion 5 and base piece portion 7 thereof in a manner which allows conduction of electricity therealong. Because the middle piece 4 (and, as previously described, possibly the base piece 2) of this exemplary workpiece is comprised of an electromechanical material, e.g., a piezoelectric material, the conduction of electricity along select ridges 11 causes deformation of those ridges 11. This deformation of those ridges 11 creates a pressure pulse in ink fluid resting in the particular microgrooves 16 adjacent those ridges 11 and ink is ejected from the particular microgrooves 16 out the head end 14 of the base piece 2 and middle piece 4 assembly. In this manner, ejection of ink from particular microgrooves 16 may be controlled by selective application of electric current to ridges 11 adjacent to the particular microgrooves 16.

One problem in the prior art in the use of such an exemplary workpiece described herein is shorting of electricity applied to select ridges 11, through fluid in adjacent microgrooves 16, to non-select ridges 11. This shorting creates unintended results like deformation not only of ridges 11 to which electrical current is intentionally applied at the abutting interface of the middle piece portion 5 and base piece portion 7 thereof, but also possibly deformation of other ridges 11 due to shorting of current through fluid within microgrooves 16 to the other ridges 11. If this shorting causes deformation of these other ridges 11, the deformation may cause ejection of ink also from non-select microgrooves 16 adjacent these other ridges 11. Ejection of ink by non-select microgrooves, among other problems, distorts the desired print image, reducing print quality due to irregular definition of the print characters.

The present invention solves this problem of shorting as well as a host .of other problems which may be satisfied by film coating, for example, film coated passivation of an array of fluid flow passages or channels such as microgrooves 16. The problem is solved by providing for an apparatus and method for coating surfaces of channels or grooves, for example, surfaces of microgrooves 16 in an ink jet printhead 20, with a material, such as an insulating resin 18 or other coating substance, to insulate particular channels or grooves from adjacent channel or groove walls to reduce and limit the possibility of shorting of electrical current through fluid within the channels or grooves to adjacent walls separating the channels or grooves. As previously stated, the foregoing description of a typical ink jet printhead is intended only as an example of the type of workpiece with which the method and apparatus of the present invention are effective and is not intended and does not limit the scope and varied applications for which the present invention may be employed.

Figure 2:
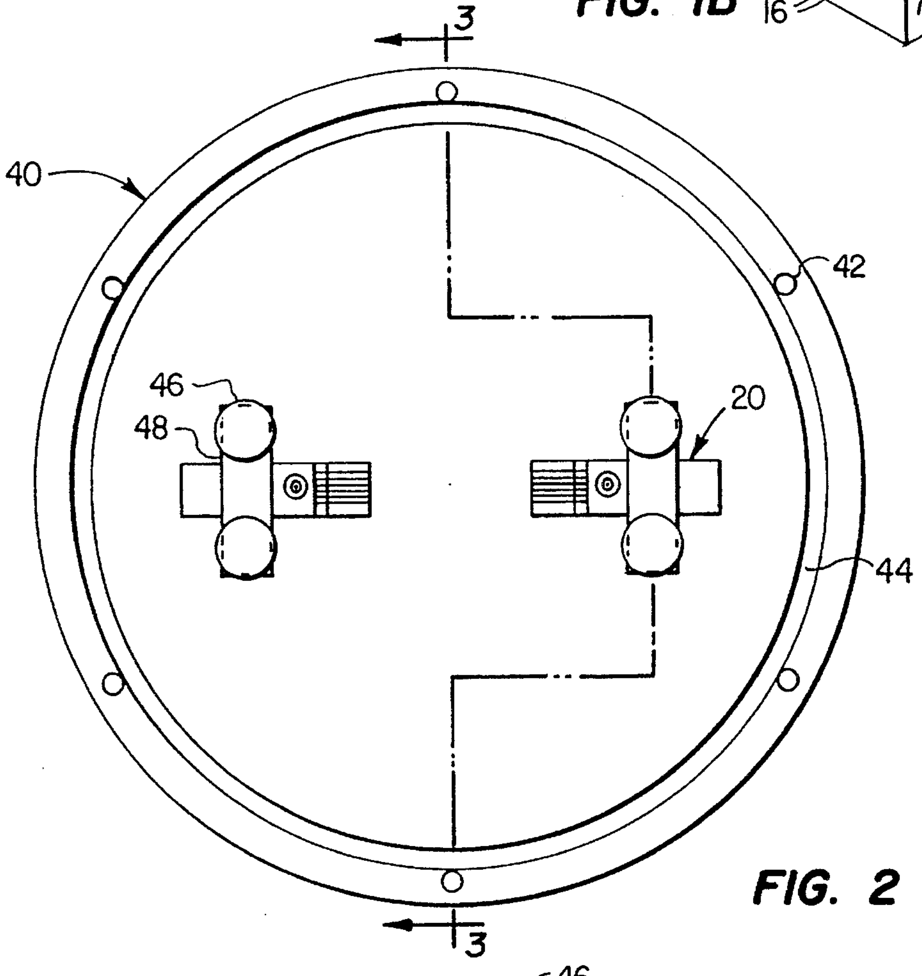
FIG. 2 is a top view of the rotation plate of the present invention depicting the location of one example of workpieces, ink jet printheads, clamped in place thereon.

Referring next to FIG. 2, an exemplary apparatus for use in accordance with the principles of the present invention in film coating surfaces of channels or grooves of a workpiece, for example, surfaces of microgrooves 16 of an ink jet printhead 20 for passivation thereof, is shown. The apparatus includes a rotation plate 40. The rotation plate 40 may be any shape that is rotatable around a centrum thereof and which is substantially balanced in such rotation when a workpiece is placed upon the rotation plate 40 as hereinafter described. Around the periphery of, or at other locations along, the rotation plate 40 may be located a series of securement screws 42. The securement screws 42 may be used to secure the rotation plate 40 to a spinning apparatus, for example, a spinner machine made by Headway, like Headway Spinner Model Nos. EC101D or PM101D, or some other spinning or centrifugation device. Within the securement screws 42 and along the periphery of the rotation plate 40 may be located an outer channel 44. The outer channel 44 serves to create a reservoir to catch and hold excess insulating resin thrown from the workpiece during the coating process hereinafter described. The rotation plate 40 is otherwise preferably a generally thin, planar assembly, although other configurations are possible. The rotation plate 40 may include openings or plate insets 54 (shown in FIG. 3), in which may be placed the workpieces to be film coated in accordance with the present invention, the workpieces being, for example, printheads 20 having microgroove 16 walls being coated on the wall surfaces for passivation thereof. As may be seen in FIG. 2, in a preferred embodiment, clamps 48 may be employed to hold the workpieces, for example, printheads 20, in place on the rotation plate 40. Clamps 48 may preferentially be secured in place, for example, by a set of nuts 46. Alternatively, workpieces may be secured to rotate with the rotation plate 40 by vacuum or other securement means.

Figure 3:
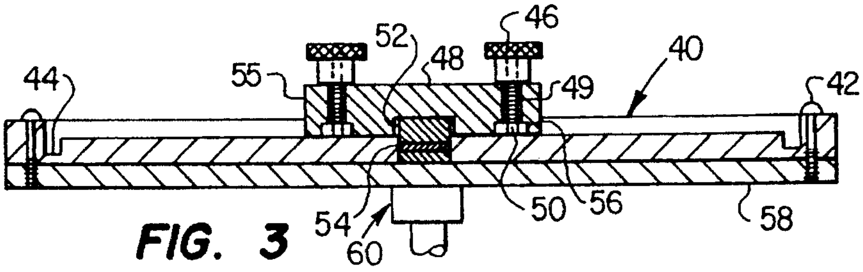
FIG. 3 is a cross sectional view of the rotation plate of FIG. 2 taken along lines 3—3.

Referring now to FIG. 3, the rotation plate 40 of FIG. 2 is seen in cross-section. In a preferred arrangement of the apparatus for the purposes of the present invention, the rotation plate 40 sits atop a spinner plate 58 of a spinner machine and is secured thereto by the securement screws 42. The spinner plate 58 is typically rotatingly secured with a spinner machine shaft 60 which stems from a spinner machine (not shown). It is seen that the rotation plate 40 includes plate insets 54 in which the workpieces, for example printheads 20, may be placed. A single plate inset 54 is possible, however, additional plate insets 54 are preferred as they may be incorporated in the design such that the rotation plate 40 is thereby spin-balanced. In an alternate embodiment, the rotation plate 40 does not include plate insets 54 but, nevertheless, includes some other suitable means for rotatably securing a workpiece with the rotation plate 40.

In the preferred embodiment, the workpieces, for example printheads 20, once placed in the plate insets 54, may be secured in place on the rotation plate 40 by clamps 48 or other fastening means. Each clamp 48 may include two screw holes 49. At the bottom side of the screw holes 49 may be located screw head holes 55. The screw head holes 55 and screw holes 49 are designed to accept clamp screws 50 and screw heads 56 thereof protruding upward from the rotation plate 40. The clamp screws 50 have screw heads 56 which secure the clamp screws 50 in place atop the rotation plate 40. Securement of the screw heads 56 to the rotation plate 40 may be by weld, adhesive, or other securing methods. The screw heads 56 fit within the screw head holes 55 of the clamps 48. The clamp screws 50 upwardly protrude a length in excess of the height of the clamp 48 and connect with nuts 46 which may be screwed thereupon to securely hold the clamp 48 in place.

In the method of the present invention of film coating surfaces of side walls of grooves or channels of a workpiece, for example the side wall surfaces of microgrooves 16 of ink jet printheads 20 (as previously described and shown in FIG. 1B) for passivation thereof, the workpiece is placed within the plate inset 54 of the rotation plate 40. The workpiece is then secured in place on the rotation plate 40, for example by a vacuum, or in a preferred embodiment, by one or more clamps 48 placed atop the workpiece. Clamp screws 50 protruding from the rotation plate 40 may be inserted through the clamps 48, and nuts 46 tightened thereon to secure the clamps 48.

Either before or after the workpiece is placed within the plate inset 54 of the rotation plate 40 and before in any manner plugging the channels or grooves of the workpiece at the stop end 13 or otherwise, an insulating resin 18, for example an epoxy, silicone, acrylic, or other insulative or otherwise suitable coating material, is deposited at the grooves or channels of the workpiece at a location thereupon inward towards the rotation plate 40 centrum from the surface to be coated. In the case of an ink jet printhead 20 workpiece, the deposition of insulating resin 18 is preferentially placed at the stop end 13 of the injector top 10 at the base piece 2 prior to plugging the microgrooves 16 as previously described with respect to the typical ink jet printhead. The printhead 20 is placed with the head end 14 outward from the centrum of the rotation plate 40 and the butt end 15 located towards the centrum. As an alternative to depositing insulating resin 18 at a particular location in relation to grooves or channels, the grooves or channels could initially be filled with the insulating resin 18, for example, due to capillary action.

Once the workpiece is so secured in place on the rotation plate 40, the rotation plate 40 is caused to planarily spin about its centrum. Although the rotation plate 40 may be caused to spin by any of a number of means, the previously described Headway spinner, attached to the rotation plate 40 in the manner aforedescribed, is a preferred means. This type of spinner typically has an on-off switch and a means for adjusting the speed and time of the spin, including, without limitation, by ramp up or ramp down of speed during a spin. Rotation of the rotation plate 40 in such manner causes the insulating resin 18 to be directed from the centrum of the rotation plate 40, for example, from the stop end 13 to the head end 14 of a printhead 20 workpiece, due to centrifugal force. This force resulting from rotation causes the insulating resin 18 to migrate through and across the surfaces of the grooves or channels of the workpiece, for example, the surfaces of microgrooves 16 of a printhead 20, thereby coating the surfaces of the channels or grooves with a layer of insulating resin 18 of a desired thickness. In the alternative method of initially filling, for example, by capillary action, the channels or grooves with insulating resin 18, the rotation step causes insulating resin 18 in excess of the amounts of insulating resin 18 necessary to suitably coat the surfaces of the microgrooves 16 to migrate from the microgrooves 16 and be thrown from the workpiece by the rotation leaving the surfaces of the channels or grooves coated with a desired layer of insulating resin 18.

Desired coating thicknesses of insulating resin 18 upon the surfaces of the channels or grooves may be achieved by, among other means, varying the rotation speed, including, without limitation, by ramp up or ramp down, of the spinner machine, by varying the time or times of the spin, and by use of different insulating resins 18 either alone, in combination or otherwise. In a printhead 20 of the type described herein as exemplary of the type workpiece with which the apparatus and method of the invention may be used, a preferred insulating resin 18 is a polymer material with a dielectric constant of five or less (at 1 kilohertz), for example, Ablebond 931-1 epoxy or Dow Corning Q1-4010 silicone, although numerous other materials and substances may be employed as the insulating resin 18. With such a preferred insulating resin 18, the desired spin speed of the rotation plate 40 to achieve coating of surfaces of microgrooves 16 in a typical printhead 20, as described, ranges from about 1,000 to about 10,000 revolutions per minute when the printhead 20 workpieces are placed on the rotation plate 40 at a radial distance of about ½ inch to about 1½ inches from the centrum thereof. Such spin rates may create an approximately less than 2 μm thick coating layer of the preferred insulating resin 18 upon the microgroove 16 channel surfaces. Tests indicate that such a thickness of the insulating resin 18 upon the microgroove 16 channel surfaces electrically insulates ridges 11 separating the microgrooves 16 to reduce or eliminate shorting through fluid in the microgrooves 16. As is readily apparent, different desired results can be achieved by varying the spinner speed, spin time, and radial location of the workpiece and by employing different insulating resin 18 materials.

All materials employed in the apparatus may be machined or molded of metal, such as steel or iron, hard plastic or some other similar resilient material. Likewise, the clamps 48 and associated securement assembly may be made of a similar strong, sturdy material. Alternatively, or in conjunction with the clamps 48, vacuum pressure may be employed to hold the workpiece in position atop the rotation plate 40 during spinning. A preferred embodiment may also include a plastic or glass hood or cover placed over the rotation plate 40 when spinning to prevent splatter of insulating resin 18 therefrom. An example of such a cover could include a plastic or glass jar-shaped shield having a mouth large enough to accept the rotation plate 40 and fit thereover.

In alternative embodiments of the present invention, the insulating resin 18 may be coated on surfaces of grooves or channels of a workpiece by other means which means may include, without limitation, air pressure or chemical deposition. Further, the apparatus for accomplishing these other means for coating surfaces of grooves or channels of a workpiece may be of a wide variety of forms and styles as may be appropriate and suitable to accomplish the desired coating by such means.

The foregoing detailed description is to be clearly understood as being given by way of illustration and example only, the spirit and scope of the present invention being limited solely by the appended claims.

What is claimed is:

1. A product having microgrooves along a workpiece, said workpiece having a portion thereof constructed of an active piezoelectric material, said microgrooves longitudinally extending along said workpiece generally parallel to each other and extending orthogonally into an upper surface of said workpiece, said microgrooves further having an insulative coating thereon, said product manufactured by a process comprising the steps of:

placing said workpiece on a rotation plate having a centrum for rotation;

securing said workpiece in position upon said rotation plate such that said microgrooves of said workpiece are generally directed from said centrum radially outward toward an outer edge of said rotation plate;

depositing an insulating resin along surfaces of said microgrooves; and spinning said rotation plate to cause said insulating resin to migrate along said surfaces of said microgrooves, thereby coating said surfaces thereof.

2. A product manufactured by the process of claim 1 wherein more than one workpiece is simultaneously coated by said process.

3. A product manufactured by the process of claim 1 wherein said workpiece is secured to said rotation plate by a clamp.

4. A product manufactured by the process of claim 1 wherein said spinning of said rotation plate is at a speed of from about 1 revolution per minute to about 10,000 revolutions per minute.

5. A product manufactured by the process of claim 1 wherein said insulating resin is deposited along a line extending across each of said microgrooves.

6. A product manufactured by the process of claim 1 wherein said microgrooves longitudinally extend along said workpiece and are generally parallel to each other and wherein said line extends generally orthogonal to said longitudinal extension of said microgrooves.

7. A product manufactured by the process of claim 1 wherein said rotation plate is spun at a speed between 1,000 and 10,000 revolutions per minute.

8. A product manufactured by the process of claim 1 wherein a coating of 2μ or less of said insulating resin is deposited on said surfaces by said spinning of said rotation plate.

9. A product having microgrooves along a workpiece, said workpiece having a portion thereof constructed of an active piezoelectric material, said microgrooves longitudinally extending along said workpiece generally parallel to each other and extending orthogonally into an upper surface of said workpiece, said microgrooves further having an insulative coating thereon, said product manufactured by a process comprising the steps of:

placing said workpiece on a rotation plate having a centrum for rotation;

securing said workpiece in position upon said rotation plate such that said microgrooves of said workpiece are generally directed from said centrum radially outward toward an outer edge of said rotation plate;

placing an insulating resin at a specified location along surfaces of said microgrooves of said workpiece; and spinning said workpiece to force said insulating resin to coatingly migrate along said surfaces of said microgrooves.

10. A product manufactured by the process of claim 9 wherein the step of spinning said workpiece to cause said insulating resin to migrate along said surfaces of said microgrooves places a centrifugal force upon said workpiece causing migration of said insulating resin along said surfaces of said microgrooves.

11. A product manufactured by the process of claim 10, wherein the step of spinning said workpiece to cause said insulating resin to migrate along said surfaces of said microgrooves further comprises the steps of:

placing said workpiece on a rotation plate having a centrum for rotation;

securing said workpiece in position upon said rotation plate such that said microgrooves of said workpiece are generally directed from said centrum radially outward toward an outer edge of said rotation plate; and spinning said rotation plate to cause said insulating resin to migrate across said surfaces of said microgrooves due to centrifugal force.

12. A product having microgrooves along a workpiece, said workpiece having a portion thereof constructed of an active piezoelectric material, said microgrooves longitudinally extending along said workpiece generally parallel to each other and extending orthogonally into an upper surface of said workpiece, said microgrooves further having an insulative coating thereon, said product manufactured by a process comprising the steps of:

placing said workpiece on a rotation plate having a centrum for rotation;

securing said workpiece in position upon said rotation plate such that said microgrooves of said workpiece are generally directed from said centrum radially outward toward an outer edge of said rotation plate;

filling said microgrooves of said workpiece with an insulating resin; and spinning said workpiece, thereby forcing the removal from said microgrooves of said insulating resin in excess of said insulating resin necessary for coating said surfaces.

13. A product manufactured by the process of claim 12 wherein the step of spinning said workpiece further comprises the step of spinning said workpiece such that centrifugal force causes migration from said microgrooves of said insulating resin in excess of said insulating resin necessary for coating said surfaces.

14. A product manufactured by the process of claim 12 wherein microgrooves of more than one workpiece are simultaneously insulated by said process.

* * * * *